United States Patent

Sakuragi et al.

[11] Patent Number: 5,461,671
[45] Date of Patent: Oct. 24, 1995

[54] TELEPHONE LINE POWER UTILITY CIRCUIT

[75] Inventors: Satosi Sakuragi; Takashi Kuroda, both of Kanagawa, Japan

[73] Assignee: Murata Mfg. Co., Ltd., Kyoto, Japan

[21] Appl. No.: 70,606

[22] Filed: Jun. 1, 1993

[30] Foreign Application Priority Data

Jun. 5, 1992 [JP] Japan .................................. 4-145931
Jun. 5, 1992 [JP] Japan .................................. 4-145932
Jun. 5, 1992 [JP] Japan .................................. 4-145933

[51] Int. Cl.$^6$ .................................................. H04M 19/00
[52] U.S. Cl. .................... 379/400; 379/394; 379/404; 379/398; 363/21; 323/266; 323/343
[58] Field of Search .......................... 379/413, 412, 379/387, 394, 398, 400, 403, 404, 412, 413, 415; 363/21, 89; 323/266, 277, 279, 258, 343; 329/387

[56] References Cited

U.S. PATENT DOCUMENTS

| | | | |
|---|---|---|---|
| 3,742,330 | 6/1973 | Hodges et al. | 323/266 |
| 4,429,186 | 1/1984 | Gortner | 379/342 |
| 4,431,869 | 2/1984 | Sweet | 379/413 |
| 4,454,466 | 6/1984 | Ritter | 323/266 |
| 4,706,281 | 11/1987 | Cubbison, Jr. | 379/413 |
| 4,893,228 | 1/1990 | Orrick et al. | 323/266 |
| 4,961,220 | 10/1990 | Tentler et al. | 379/413 |
| 5,034,871 | 7/1991 | Okamoto et al. | 363/21 |
| 5,144,544 | 9/1992 | Jenneve et al. | 363/21 |
| 5,181,240 | 1/1993 | Sakuragi et al. | 379/413 |
| 5,208,432 | 5/1993 | Han | 363/21 |
| 5,289,359 | 2/1994 | Ziermann | 363/21 |

*Primary Examiner*—Jeffery A. Hofsass
*Assistant Examiner*—Scott L. Weaver
*Attorney, Agent, or Firm*—Jordan and Hamburg

[57] ABSTRACT

A telephone line power utility circuit, in which direct-current power supplied through a telephone line-side is utilized as a power source for a line terminal device having a direct-current resistance, the telephone line power utility circuit including a DC-DC converter connected with the line terminal device for supplying the direct-current power to the line terminal device, the DC-DC converter having an input direct-current resistance; and a central processing unit (CPU), connected with the DC-DC converter, for obtaining a maximum input direct-current resistance of the DC-DC converter to increase the efficiency of receiving power of the DC-DC converter by allowing the direct-current resistance of the line terminal device, viewed from the telephone line-side, to satisfy a predetermined standard, controlling the duty ratio of the primary side switching element, and/or switching the taps of the primary side winding of the transformer of the DC-DC converter, such that the direct-current power supplied through the telephone line can effectively be used as a power source for the line terminal device.

20 Claims, 8 Drawing Sheets

TELEPHONE LINE POWER UTILITY CIRCUIT

BACKGROUND OF THE INVENTION

I. Field of the Invention

This invention relates to a telephone line power utility circuit, and in more detail to a telephone line power utility circuit capable of utilizing a direct-current power supplied from the telephone lines as power sources for line terminal equipment such as telephone sets, modulation-demodulation devices (modems), facsimile devices and the like.

II. Description of the Prior Art

FIG. 7 is a circuit diagram of the conventional telephone line power utility circuit 501. In this telephone line power utility circuit 501, a direct-current voltage, which is supplied by the telephone line through a bridge diode BD, a hook switch HS, a DC separation transistor Q1 and a low-pass filter LPF, is converted by a DC-DC converter CN and used as a power source for a line terminal device main-body circuit TA. Symbol Vcc stands for a battery or the other external power supplies to be a power source of the line terminal device main-body circuit TA when the output from the DC-DC converter CN is insufficient.

A signal component is processed by being taken into a signal processing circuit (not shown in the figure) of the line terminal equipment main-body circuit TA through a direct-current interrupting capacitor C1 behind the hook switch HS.

A drive output circuit DO pulse-drives a switching element Tr1 of the DC-DC converter CN at a predetermined duty ratio.

FIG. 8 is a schematic diagram of a direct-current circuit formed of an exchange plant, telephone lines, and line terminal device. A direct-current resistance RS of the line terminal equipment viewed from the telephone line-side is the sum of the direct-current resistance RD of the bridge diode BD, a direct-current resistance RH of the hook switch HS and an input direct-current resistance RI of the DC-DC converter, satisfying the following equation, $$RS = RD + RH + RI \quad (1).$$

The direct-current resistance RS, in accordance with the JATE Japanese Approval Institute for Telecommunication Equipment standards, for example, is regulated at 50Ω to 300Ω n when the line current I is 20 mA to 120 mA. The direct-current resistance RS, in accordance with the FCC standards, for example, is regulated below 200Ω when the line current I is 30 mA to 120 mA. The line current I satisfies, $$I = E/(R1 + R2 + RS) \quad (2),$$

where, E represents a direct-current output voltage of the exchange plant, R1 a direct-current resistance of the exchange plant, and R2 a line resistance. The sum R1+R2, fluctuates depending on a length of the line, but normally is greater than When the input direct-current resistance RI of the DC-DC converter is large, the DC-DC converter CN receives the direct-current power from the telephone line-side with a high efficiency.

However, the problem encountered in the conventional telephone line power utility circuit 501 is that, the receiving efficiency is low since the input direct-current resistance RI of the DC-DC converter CN is fixed at a lower value as a whole such that the direct-current resistance RS of the line terminal equipment viewed from the telephone line-side, takes a resistance value between 50Ω and 300Ω.

SUMMARY OF THE INVENTION

It is a general object of this invention to provide a telephone line power utility circuit capable of improving the receiving efficiency.

In first embodiment, a telephone line power utility circuit of this invention, in which a direct-current power supplied from a telephoneline-side is utilized as a power source for a line terminal equipment includes a DC-DC converter connected with the line terminal equipment, for supplying the direct-current power to the line terminal equipment, and an input direct-current resistance control means for controlling an input direct-current resistance of the DC-DC converter for increasing a receiving power of the DC-DC converter and for allowing a direct-current resistance of the line terminal equipment viewed from the telephone line-side to be within a predetermined range.

In the above mentioned first characteristic of this telephone line power utility circuit, the input direct-current resistance of the DC-DC converter is controlled in such a way that, the input direct-current resistance RI of the DC-DC converter is made larger within a range, where the direct-current resistance of the line terminal equipment, viewed from the telephone line-side, is within the predetermined is within even if the line current varies.

In a second embodiment, a telephone line power utility circuit of this invention, in which a direct-currentpowersupplied from a telephoneline-side is utilized as a power source for a line terminal equipment includes a DC-DC converter connected with the line terminal equipment, for supplying the direct-current power to the line terminal equipment, and, a duty ratio control means for controlling a duty ratio of a primary side switching element of the DC-DC converter for increasing the receiving power of the DC-DC converter and for allowing a direct-current resistance of the line terminal equipment viewed from the telephone line-side to be within a predetermined range.

In the above mentioned second characteristic of this telephone line power utility circuit, the duty ratio of the primary side switching element of the DC-DC converter is controlled in such a way that, the input direct-current resistance RI of the DC-DC converter is made larger within a range, where the direct-current resistance of the line terminal equipment, viewed from the telephone line-side, is within the predetermined range even if the line current varies.

In a third embodiment, the telephone line power utility circuit of this invention, in which a direct-current power supplied from a telephoneline-side is utilized as a power source for a line terminal equipment includes a DC-DC converter connected with the line terminal equipment, for supplying the direct-current power to the line terminal equipment, and, a transformer tap changer means for switching taps of a primary side winding of a transformer of the DC-DC converter for increasing the receiving power of the DC-DC converter and for allowing a direct-current resistance of the line terminal equipment viewed from the telephone line-side to be within a predetermined range.

In the above mentioned third characteristic of this telephone line power utility circuit, the input direct-current resistance is controlled by switching the taps of the primary side winding of the transformer of the DC-DC converter in such a way that, the input direct-current resistance RI of the DC-DC converter is made larger within a range, where the direct-current resistance of the line terminal equipment, viewed from the telephone line-side, is within the predetermined range even if the line current varies.

Due to the above mentioned three characteristics of the present invention, a direct-current power supplied from the telephone line can effectively be received.

BRIEF DESCRIPTION OF THE DRAWINGS

The present invention is illustrated diagrammatically in the following drawings, wherein.

DESCRIPTION OF THE PREFERRED EMBODIMENT

The embodiments of this invention will be described in more detail with reference to the accompanying drawings. While the embodiments of the present invention, as herein disclosed, constitute a preferred form, it is to be understood that other forms might be adopted.

FIRST EMBODIMENT

Figure 1:
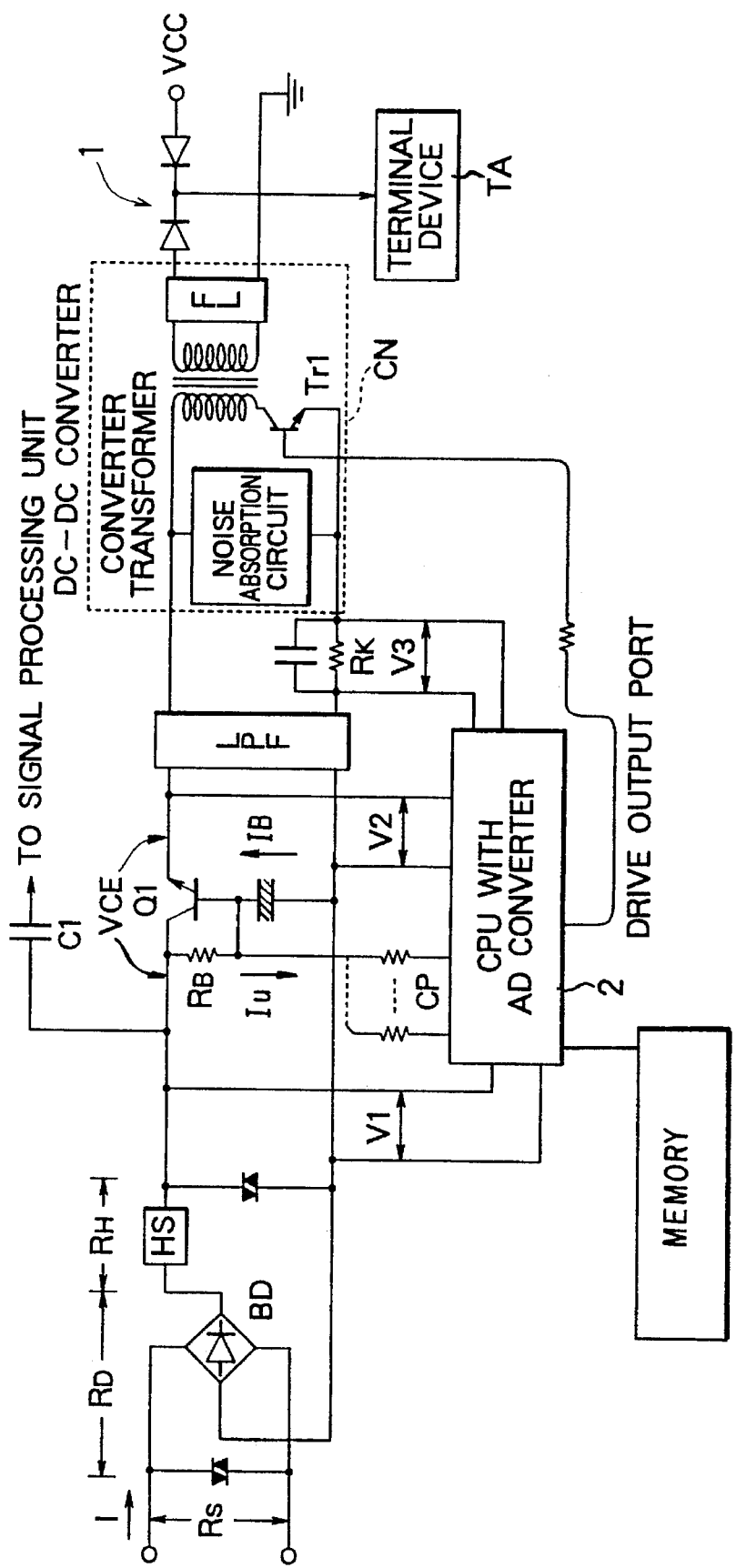
FIG. 1 is a circuit diagram of a telephone line power utility circuit in accordance with a first embodiment of this invention.

FIG. 1 is a circuit diagram of a telephone line power utility circuit 1 according to a first embodiment of this invention. In the telephone line power utility circuit 1, a direct-current voltage, which is supplied from the telephone line-side through abridge diode BD, a hook switch HS, a DC separation transistor Q1, and a low-pass filter LPF, is converted by a DC-DC converter CN, and used as a power source for a line terminal device main-body circuit TA. Symbol Vcc stands for a battery or any other external power supplied to a power source for the line terminal device main-body circuit TA when the output from the DC-DC converter CN is insufficient.

A signal component is processed by being taken in a signal processing circuit (not shown in the diagram) of the line terminal device main-body circuit TA through a direct-current interrupting capacitor C1 behind the hook switch HS.

A CPU (marked 2 in the diagram) having an AD converter, pulse-drives a switching element Tr1 of the DC-DC converter CN and controls its duty ratio for obtaining a maximum value of an input direct-current resistance RI of the DC-DC converter CN within a range equal to or less than 300Ω of a direct-current resistance of a line terminal equipment viewed from the telephoneline-side. This CPU also controls the bias voltage such as to prevent a voltage drop in the DC separation transistor Q1 from being equal to or more than a required proper value.

Thereby, loss in the DC separation transistor Q1 is minimized, and the direct-current power supplied through the telephone line can be effectively received.

Figure 2:
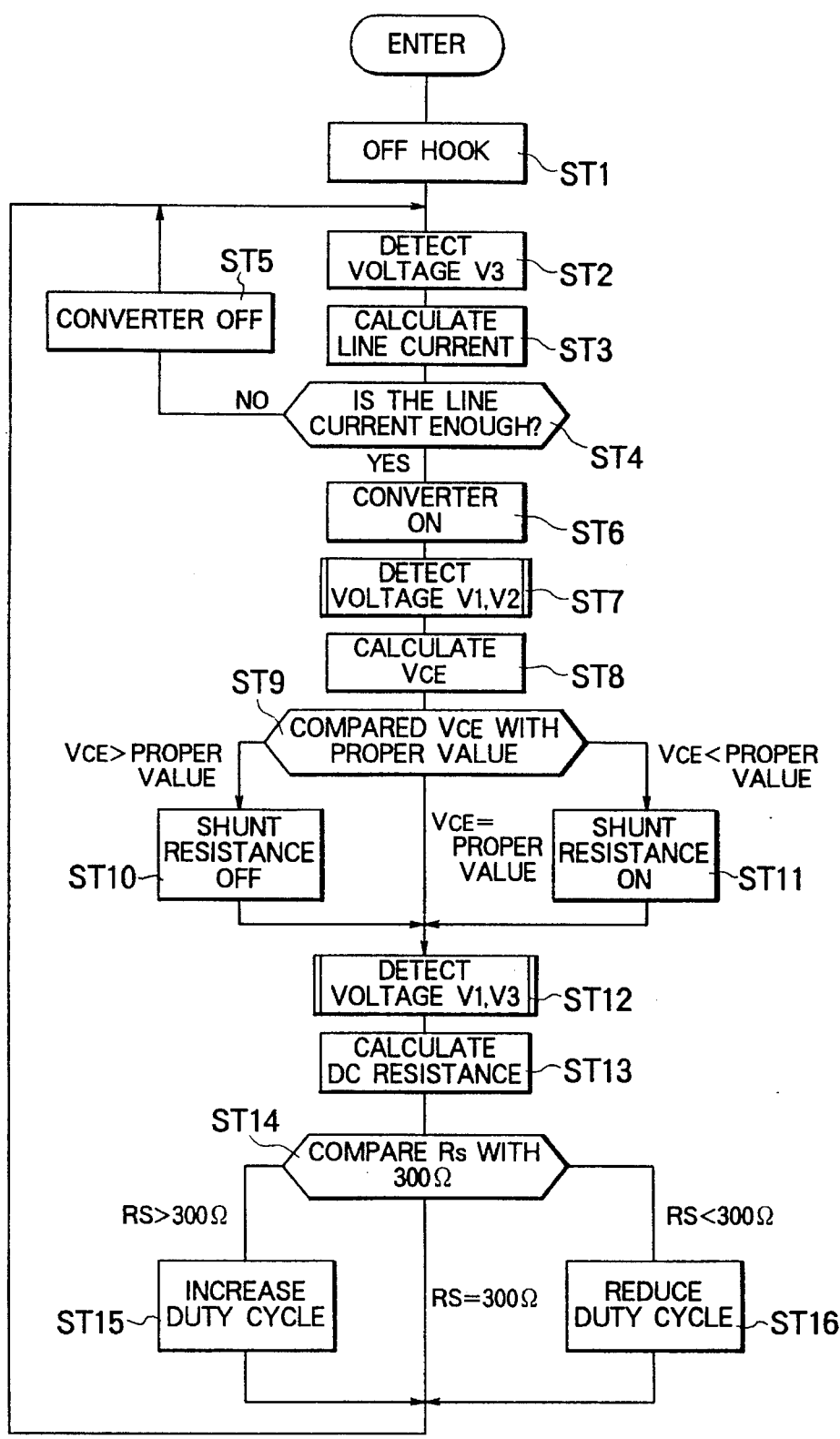
FIG. 2 is a flow chart showing operation of the telephone line power utility circuit shown in FIG. 1.

FIG. 2 is a flow chart showing operations of the CPU 2 having the AD converter. When the hook switch HS is in an off hook state (step ST1), a voltage V3 in FIG. 1 is detected (step ST2) and line current I is calculated in the next step (step ST3) according to the equation, $$I=V3/Rk.$$

where, Rk represents a resistance value of a current detecting resistance.

Next, it is determined whether or not the line current I reaches a minimum current (approximately 15 mA) of the telephone line (step ST4). If the line current I does not reach the minimum current, a control proceeds to step ST5, and if it reaches the minimum current, the control proceeds to step ST6.

In step ST5, the DC-DC converter CN is switched off and the control returns to step ST2.

In step ST6, the DC-DC converter CN is switched on. Here, the duty ratio, which pulse-drives the switching element Tr1 of the DC-DC converter CN, is in the memory. If no duty ratio is stored in the memory, a maximum duty ratio within a range to be controllable (then, the input direct-current resistance RI of the DC-DC converter CN becomes a minimum value) is assumed. The maximum duty ratio within a range to be controllable means the maximum duty ratio at which the DC-DC converter functions properly.

The CPU 2 having the AD converter detects the voltages V1 and V2 in FIG. 1 (step ST7), and calculates the voltage VCE of the DC separation transistor Q1 (the voltage across the collector and the emitter) (step ST8).

The voltage VCE is compared with a proper value (step ST9). This proper value is, for example, an extent of ½ the amplitude (2V in case of modem) of the signal component.

If the voltage VCE is greater than the proper value, then the control proceeds to step ST10. If the voltage VCE is less than proper value, then the control proceeds to step ST11. If the voltage VCE equals the proper value, then the control proceeds to step ST12.

In step ST10, the control port CP is controlled to enlarge the bias shunt resistance value and to decrease the bias control current Iu. Thus, the bias current IB becomes large and the collector-emitter voltage VCE tends to be smaller.

In step ST11, the control port CP is controlled to decrease the bias shunt resistance value and to increase the bias control current Iu. Thus, the bias current IB becomes small and the collector-emitter voltage VCE tends to be higher.

Finally, the voltage VCE is made to converge to the proper value through the operations from step ST7 to step ST11.

In the step ST12, the voltages V1 and V3 are detected.

Next, a direct-current resistance RS of the telephone line power utility circuit 1 as viewed from the telephone line-side is calculated (step ST13) using, $$I=V3/Rk \text{ and}$$

$$Rs=(V1/I)+(RD+RH)$$

Next, the direct-current resistance RS is compared with 300Ω (preferably, compared with the value a little smaller than 300Ω) (step ST14). If RS is greater than 300Ω, then the control proceeds to step ST15. If RS is less than 300Ω, then the control proceeds to step ST16. If RS equals to 300Ω, then the control returns to step ST2 described.

In step ST15, the duty ratio of a drive output from the drive output port is increased from the present value. Due to this, the direct-current resistance RS decreases to be. Thereafter, the said duty ratio is stored in the memory, and then the control returns to step ST2.

In step ST16, the duty ratio of the drive output from the drive output port is decreased from its present value. Due to this, the direct-current resistance RS increases. Thereafter, the said duty ratio is stored in the memory, and then the control returns to step ST2.

In this way, the direct-current resistance RS is converged into 300Ω by operations from step ST12 to step ST16.

SECOND EMBODIMENT

Figure 3:
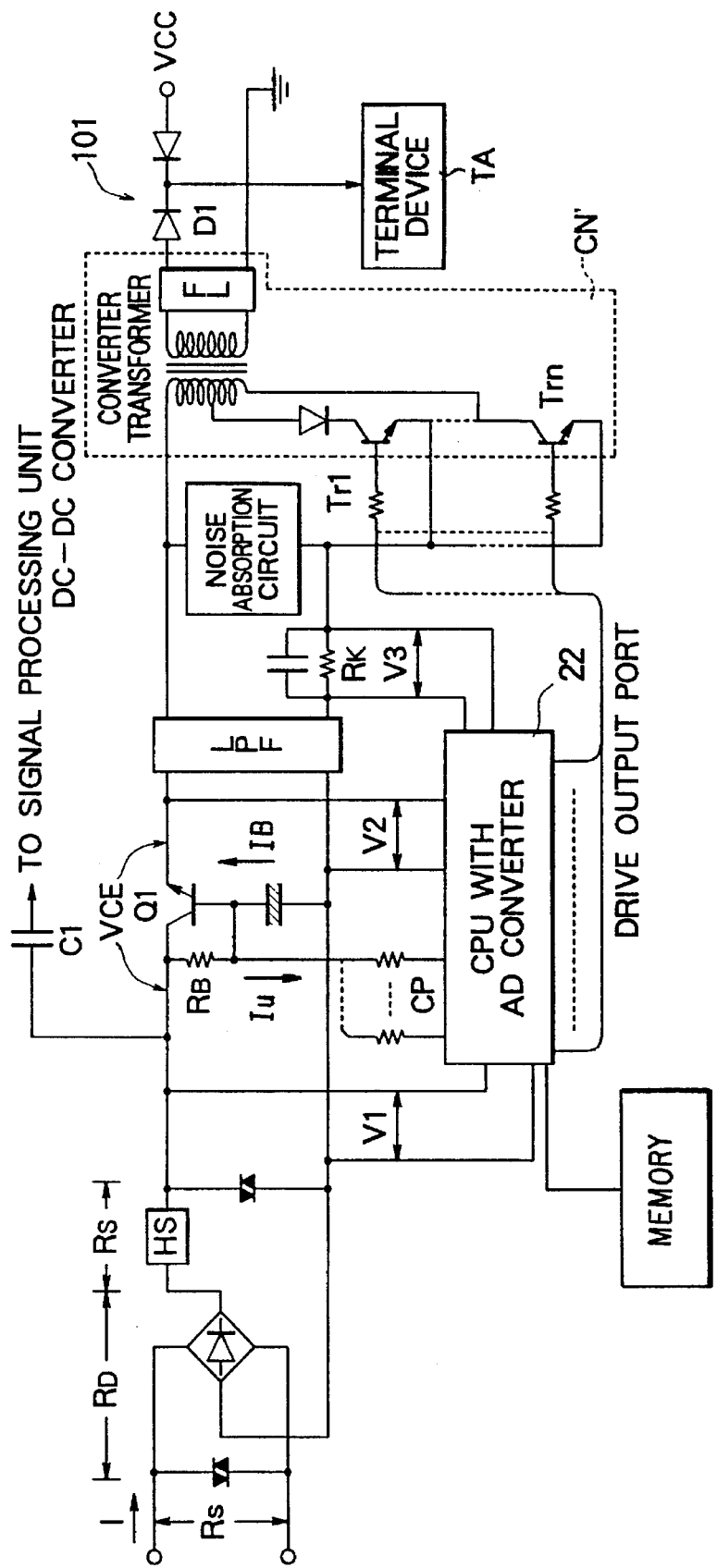
FIG. 3 is a circuit diagram of a telephone line power utility circuit in accordance with a second embodiment of this invention.

FIG. 3 is a circuit diagram of a telephone line power utility circuit 101 according to a second embodiment of the present invention. The construction of the telephone line power utility circuit 101 is substantially the same as the telephone line power utility circuit 1 shown in FIG. 1. The difference in the two is that a plurality of taps are provided on a primary side of a converter transformer of a DC-DC converter CN' and connected with switching elements Tr1 to Trn respectively, which are selected and operated alternatively by the CPU (marked 22 in the diagram) having an AD converter.

By selecting the switching elements alternatively from Tr1 to Trn, the taps at the primary side of the converter transformer are switched and controlled for obtaining the maximum value of an input direct-current resistance RI of the DC-DC converter CN' within a range equal to or less than 300Ω of the direct-current resistance of the line terminal device viewed from the telephone line-side. This provides an effective receiving of the direct-current power supplied from the telephone line.

Figure 4:
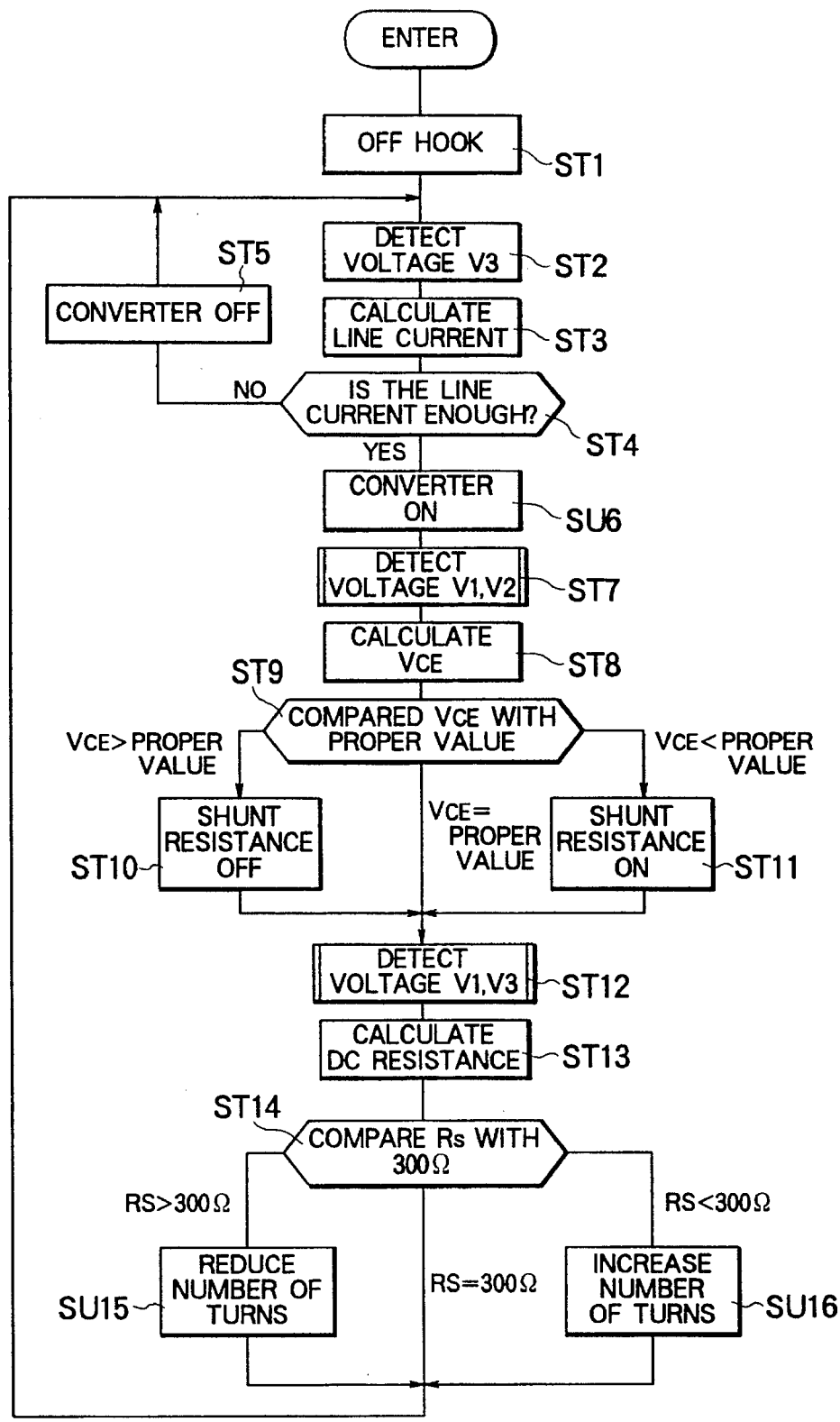
FIG. 4 is a flow chart showing operation of the telephone line power utility circuit shown in FIG. 3.

FIG. 4 is a flow chart showing operations of the CPU 22 having the AD converter. The flow chart in FIG. 4 is very much similar to the already described flow chart of FIG. 2 with the differences that, ST6 in FIG. 2 is changed to SU6, and steps ST15, ST16 in FIG. 2 are changed to SU15, SU16 respectively. Accordingly, only steps SU6, SU15, and SU16 will be described below.

In step SU6, the number of DC-DC converter CN' is switched on. Then, the switching elements for alternatively operating are stored in the memory along with the number of windings of the different switching elements. When in formation regarding the switching element is not stored in the memory, then a switching element with the minimum number of turns of the winding (then, the input direct-current resistance RI of the DC-DC converter CN' becomes a minimum value)is considered.

In step SU15, the switching element with the number of turns of the winding less than the present number of turns, is selected. Thus, the direct-current resistance RS decrease. Thereafter, this switching element is stored in the memory, and then the control returns to step ST2.

In step SU16, the switching element with the number of turns of the winding greater than the present number of turns, is selected. Thus, the direct-current resistance RS increase. Thereafter, this switching element is stored in the memory, and then the control returns to step ST2.

Consequently, the direct-current power supplied from the telephone line is effectively received.

THIRD EMBODIMENT

Figure 5:
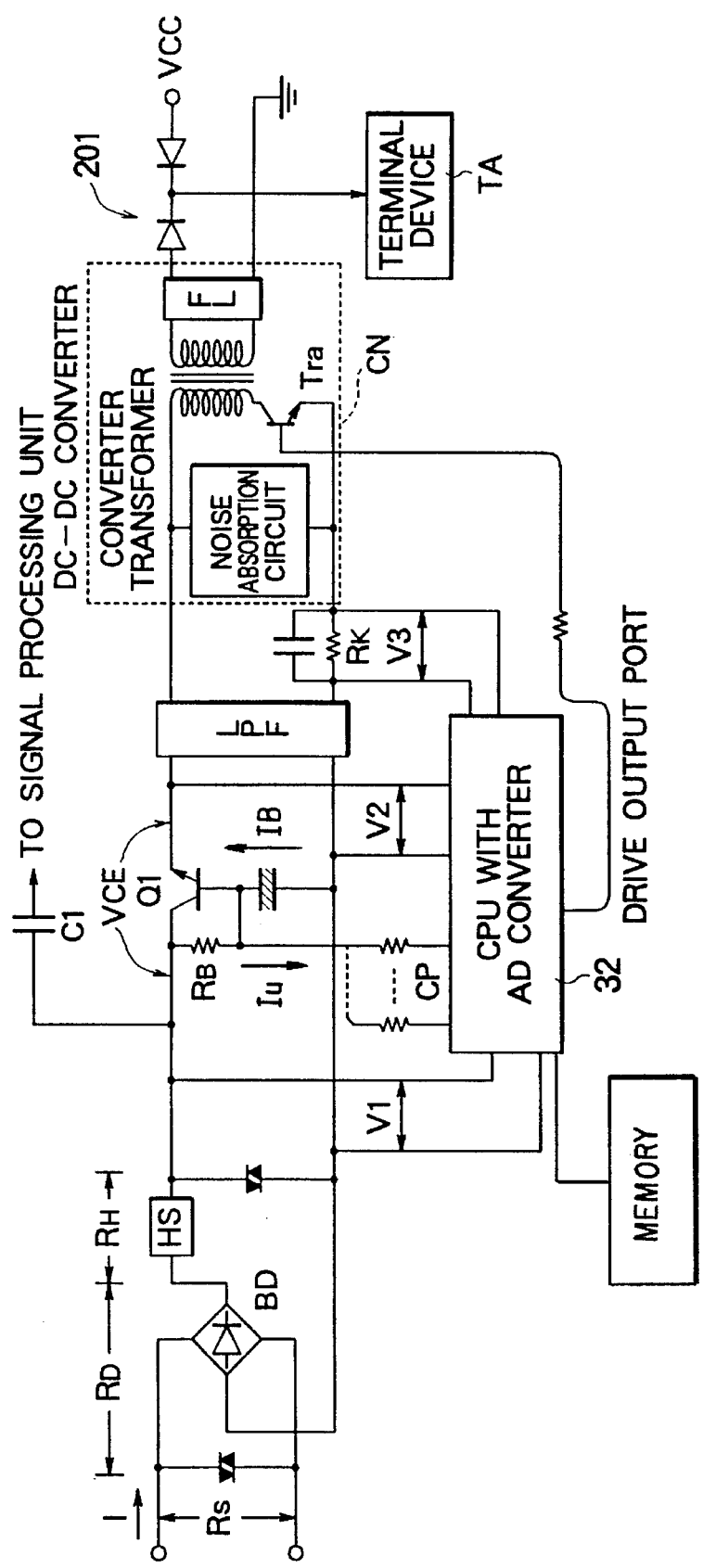
FIG. 5 is a circuit diagram of a telephone line power utility circuit in accordance with a third embodiment of this invention.

FIG. 5 is a circuit diagram of a telephone line power utility circuit 201 according to a third embodiment of the present invention. In the telephone line power utility circuit 201, a direct-current voltage, which is supplied from the telephone line-side through a bridge diode BD, a hook switch HS, a DC separation transistor Q1, and a low-pass filter LPF, is converted by a DC-DC converter CN and used as a power source for a line terminal device main-body circuit TA. Symbol Vcc stands for a battery or any other external power supplies to be a power source for the line terminal device main-body circuit TA when the output from the DC-DC converter CN is insufficient.

A signal component is processed by being taken in a signal processing circuit (not shown in the diagram) of the line terminal device main-body circuit TA through a direct-current interrupting capacitor C1 behind the hook switch HS.

A CPU (marked 32 in the diagram) having an AD converter, pulse-drives a primary side switching element Tra of the DC-DC converter CN and controls a duty ratio for obtaining the maximum value of an input direct-current resistance RI of the DC-DC converter CN within a range equal to or less than 300Ω of the direct-current resistance of the line terminal equipment viewed from the telephone line-side. This CPU also controls the bias voltage in order to prevent a voltage drop in the DC separation transistor Q1 from being equal to or more than a required proper value.

This provides an effective receiving of the direct-current power supplied through the telephone line.

Figure 6:
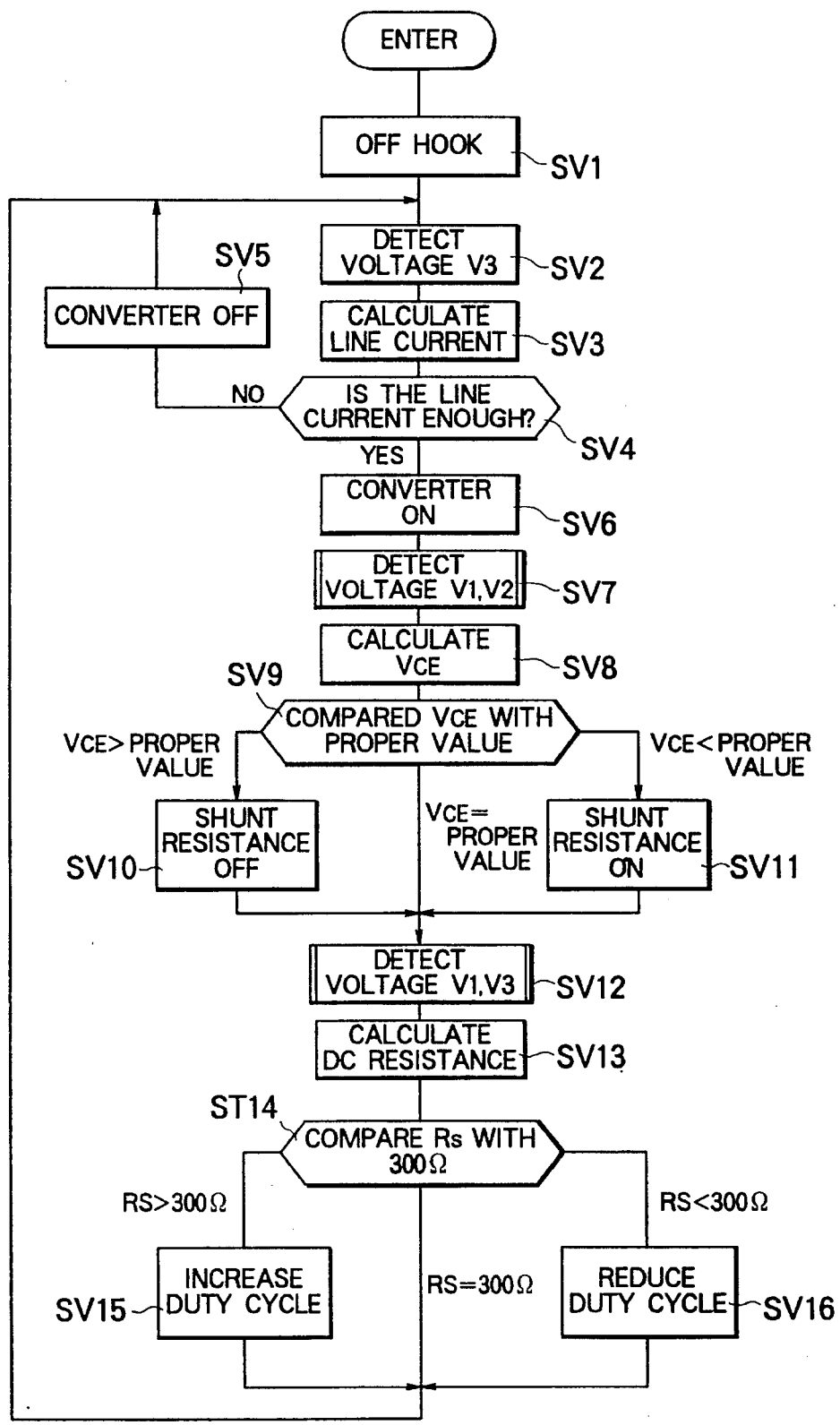
FIG. 6 is a flow chart showing operation of the telephone line power utility circuit shown in FIG. 5.
Figure 7:
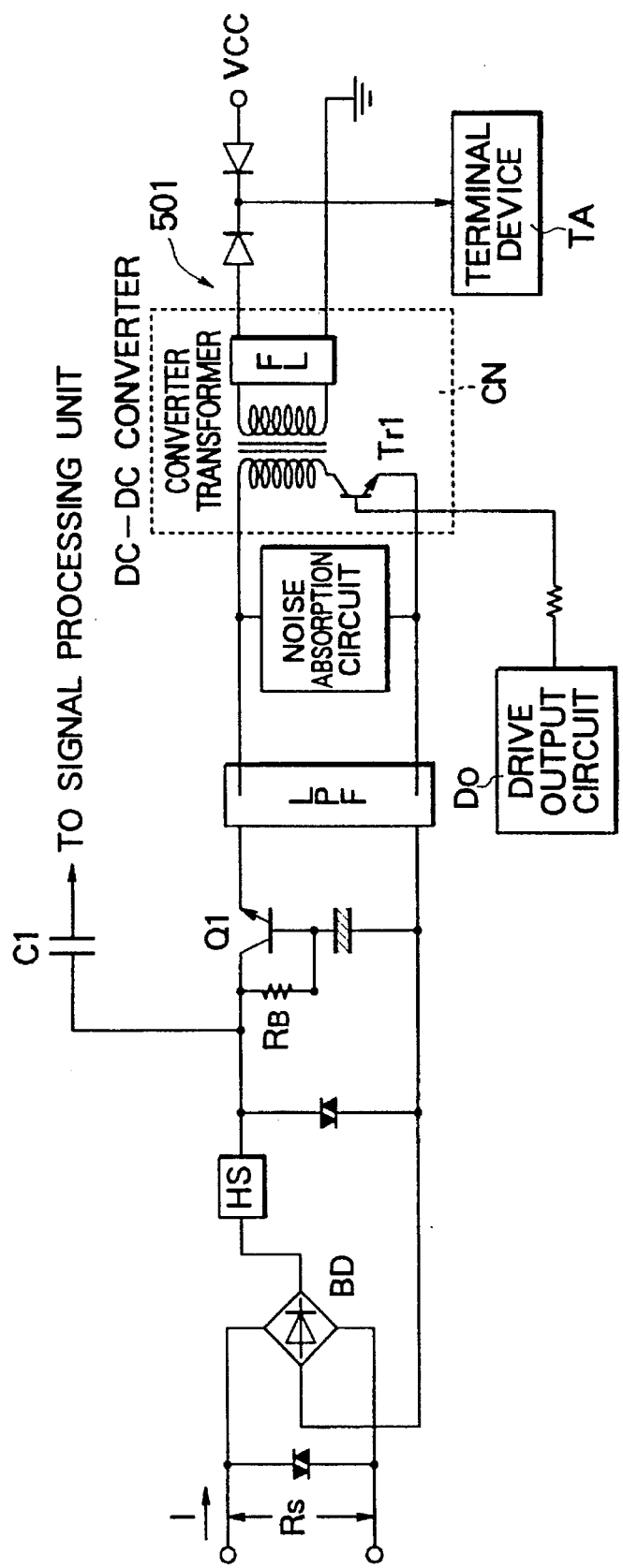
FIG. 7 is a circuit diagram of the conventional telephone line power utility circuit.
Figure 8:
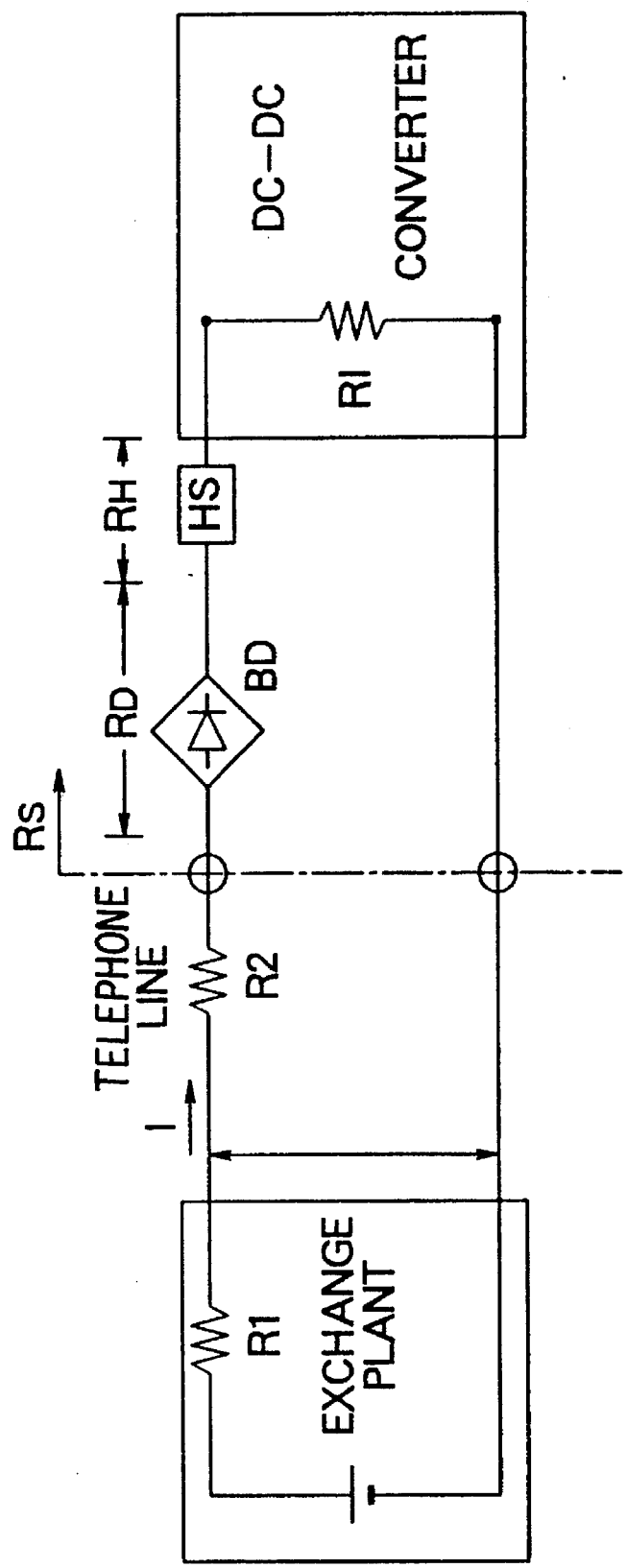
FIG. 8 s a schematic diagram of a direct-current circuit.

FIG. 6 is a flow chart showing operations of the CPU 32 having the AD converter. A hook switch HS is placed in an OFF hook state (step SV1), then the voltage V3 in FIG. 5 is detected (step SV2), and line current I is calculated (step SV3) using, $$I=V3/Rk,$$

where, Rk represents a resistance value of a current detecting resistance.

Next, it is determined whether or not the line current I reaches a minimum current (approximately 15 mA). If the line current I does not reach the minimum current, then the control proceeds to step SV5, and if it reaches the minimum current, then the control proceeds to step SV6.

In step SV5, the DC-DC converter CN is switched off and the control returns to step SV2.

In step SV6, the DC-DC converter CN is switched on. Here, the duty ratio, which pulse-drives a primary side switching element Tra of the DC-DC converter CN is stored in the memory. If no duty ratio is stored in the memory then, a maximum duty ratio within a range to be controllable (then, the input direct-current resistance RI of the DC-DC converter CN becomes a minimum value) is assumed.

Next, the CPU 32 having the AD converter detects the voltages V1 and V2 in FIG. 5 (step SV7), and calculates a voltage VCE (a voltage across a collector and an emitter) of the DC separation transistor Q1 (step SV8).

The voltage VCE is compared with a proper value (step SV9). This proper value is, for example, approximately ½ the amplitude (2V in case of modem) of signal component.

If the voltage VCE is greater than the proper value, then the control proceeds to step SV10. If the voltage VCE is less than the proper value, then the control proceeds to step SV11. If the voltage VCE is equal to the proper value, then the control proceeds to step SV12.

In step SV10, the control port CP is controlled to enlarge the bias shunt resistance value and to decrease the bias control current Iu. Thus, the bias current IB increases and the collector-emitter voltage VCE tends to be smaller.

In step SV11, the control port CP is controlled to decrease the bias shunt resistance value and to increase the bias control current Iu. Thus, the bias current IB becomes small and the collector-emitter voltage VCE tends to be higher.

Finally, the voltage VCE is made to converge to the proper value through the operations from step SV7 to step SV11.

In step SV12, the voltages V1 and V3 are detected.

Next, a direct-current resistance RS of the telephone line power utility circuit 201 as viewed from the telephone line-side is calculated (step SV13) using, $$I = V3/Rk \text{ and}$$

$$RS = (V1/I) + (RD + 30\ RH).$$

Next, the direct-current resistance RS is compared with 300Ω (preferably compared with the value a little less than 300Ω) (step SV14). If RS is greater than 300Ω, then the control proceeds to step SV15. If RS is less than 300Ω, then the control proceeds to step SV16. If RS is equal to 300Ω, then the control returns to step SV2 described earlier.

In step SV15, a duty ratio of a drive output from a drive output port is increased from the present value. Thus, the direct-current resistance RS is smaller. Thereafter, said duty ratio is stored in a memory, and then the control returns to step SV2.

In step SV16, the duty ratio of the drive output from the drive output port is made smaller. Thus, the direct-current resistance RS tends to be larger. Thereafter, this duty ratio is stored in the memory, and then the control returns to step SV2.

Finally, the direct-current resistance RS is converged into 300Ω by processes from step SV12 to step SV16.

As a result, the loss in the DC separation transistor Q1 is minimized and the direct-current power supplied from the telephone lines is effectively received.

What is claimed is;

1. A telephone line power utility circuit, in which direct-current power supplied through a telephone line is utilized as a power source for a line terminal device, comprising:

DC-DC converter means, connected to said line terminal device, for supplying said direct-current power to said line terminal device, said DC-DC converter means having an input direct-current resistance circuit;

input direct-current resistance control means, connected to said DC-DC converter means, for controlling an input direct-current resistance of said input direct-current resistance circuit of said DC-DC converter means so as to obtain highest efficiency of receiving power of the DC-DC converter means within a predetermined range and to cause the direct-current resistance of the telephone line power utility circuit, viewed from the telephone line-side, to be within a predetermined range for said telephone line, said input direct-current resistance control means including means for:

sensing a line current and rectified input voltage of said telephone line;

calculating a resistance using said rectified input voltage and said line current;

comparing said resistance with a reference value which is a highest resistance value permitted by said predetermined range; and changing said input direct-current resistance so as to maintain said resistance close to said highest resistance value.

2. A telephone line power utility circuit, in which direct-current power supplied through a telephone line is utilized as a power source for a line terminal device, comprising:

DC-DC converter means, connected to said line terminal device, for supplying said direct-current power to said line terminal device, said DC-DC converter means having a transformer with a primary side winding and a switching element with a duty ratio connected to said winding;

duty ratio control means for controlling the duty ratio of said switching element of said DC-DC converter means so as to obtain highest efficiency of receiving power of the DC-DC converter means within a predetermined range and to cause the direct-current resistance of the telephone line power utility circuit, viewed from the telephone line-side, to be within a predetermined range for said telephone line, said duty ratio control means including means for:

sensing a line current and rectified input voltage of said telephone line;

calculating a resistance using said rectified input voltage and said line current;

comparing said resistance with a reference value which is a highest resistance value permitted by said predetermined range; and changing said duty ratio of said switching element so as to maintain said resistance close to said highest resistance value.

3. A telephone line power utility circuit, in which direct-current power supplied through a telephone line is utilized as a power source for a line terminal device, comprising:

DC-DC converter means, connected to said line terminal device, for supplying said direct-current power to said line terminal device, said DC-DC converter means having a transformer with a primary side winding, said primary side winding having turns, and taps for increasing or decreasing the number of turns of said primary side winding;

tap changer means for switching said taps of said primary side winding of said transformer of said DC-DC converter means so as to obtain highest efficiency of receiving power of the DC-DC converter means within a predetermined range and to cause the direct-current resistance of the telephone line power utility circuit, viewed from the telephone line-side, to be within a predetermined range for said telephone line, said tap changer means including means for:

sensing a line current and rectified input voltage of said telephone line;

calculating a resistance using said rectified input voltage and said line current;

comparing said resistance with a reference value which is a highest resistance value permitted by said predetermined range; and changing the taps of said primary side winding so as to maintain said resistance as close as possible to said highest resistance value.

4. A telephone line power utility circuit according to claim 1, further including:

a diode bridge having an input connected to the telephone line, and further having an output and a resistance RD, and a hook switch having an input connected to the output of the diode bridge, and further having an output and a resistance RH; and wherein said direct-current resistance of said telephone line power utility circuit, as viewed from the telephone-line side, is composed of a sum of said resistance RD, said resistance RH and said input direct-current resistance of the DC-DC converter means.

5. A telephone line power utility circuit according to claim 1, wherein said input direct-current resistance circuit includes a switching element having a control input, and said input direct-current resistance control means includes a central processing unit connected to said control input of said switching element of said DC-DC converter means which drives said switching element.

6. A telephone line power utility circuit according to claim 5, wherein said input direct-current resistance circuit includes a transformer connected to said switching element, and said switching element includes a transistor having a base as said control input and a current path through the collector and emitter of the transistor, said current path being connected to a primary winding of said transformer and said base being connected to said central processing unit to change said input direct-current resistance of said DC-DC converter means.

7. A telephone line power utility circuit according to claim 2, further including:

a diode bridge having an input connected to the telephone line, and further having an output and a resistance RD, and a hook switch having an input connected to the output of the diode bridge, and further having an output and a resistance RH; and wherein said direct-current resistance of said telephone line power utility circuit, as viewed from the telephone-line side, is composed of a sum of said resistance RD, said resistance RH and said input direct-current resistance of the DC-DC converter means.

8. A telephone line power utility circuit according to claim 2, wherein said switching element has a control input, and said duty ratio control means includes a central processing unit connected to said control input of said switching element of said DC-DC converter means which drives said switching element on the basis of said duty ratio.

9. A telephone line power utility circuit according to claim 8, wherein said switching element includes a transistor having a base as said control input and a current path through collector and emitter of the transistor, said current path being connected to a primary winding of said transformer and said base being connected to said central processing unit to change said input direct-current resistance of said DC-DC converter means.

10. A telephone line power utility circuit according to claim 3, further including:

a diode bridge having an input connected to the telephone line, and further having an output and a resistance RD, and a hook switch having an input connected to the output of the diode bridge, and further having an output and a resistance RH; and wherein said direct-current resistance of said telephone line power utility circuit, as viewed from the telephone-line side, is composed of a sum of said resistance RD, said resistance RH and said input direct-current resistance of the DC-DC converter means.

11. A telephone line power utility circuit according to claim 3, wherein said DC-DC converter means includes a plurality of switching elements connected to different ones of said taps of said primary side winding, respectively, and said tap changer means includes a central processing unit connected to said switching elements of said DC-DC converter means to switch the taps of the primary side winding.

12. A telephone line power utility circuit, in which direct-current power supplied through a telephone line is utilized as a power source for a line terminal device, comprising:

a DC-DC converter, connected to said line terminal device, for supplying said direct-current power to said line terminal device, said DC-DC converter having an input direct-current resistance circuit;

input direct-current resistance control means, connected to said DC-DC converter, for controlling an input direct-current resistance of said input direct-current resistance circuit of said DC-DC converter so as to obtain highest efficiency of receiving power of the DC-DC converter within a predetermined range and to cause the direct-current resistance of the telephone line power utility circuit, viewed from the telephone line-side, to be within a predetermined range for the telephone line;

a diode bridge having an input connected to a telephone line, and further having an output, and a hook switch having an input connected to the output of said diode bridge, a resistance HS;

a low pass filter connected to an input of said DC-DC converter;

a separation transistor having a current path connected between said hook switch and said low pass filter, and said separation transistor further having a control input connected to said input direct-current resistance control means;

a bias shunt resistance circuit connected between said control input of said separation transistor and said input direct-current resistance control means; and said input direct-current resistance control means including means for:

changing said input direct-current resistance of said DC-DC convertor so as to maintain said direct-current resistance of the telephone line power utility circuit close to a reference value which is a highest resistance value permitted by the predetermined range, and changing a bias shunt resistance value of said bias shunt resistance circuit so as to control power loss in said separation transistor.

13. A telephone line power utility circuit, in which direct-current power supplied through a telephone line is utilized as a power source for a line terminal device, comprising:

a transistor circuit which includes a separation transistor having a control input and a current path and a bias circuit which supplies a bias current to said control input of the separation transistor;

a DC-DC converter connected to said line terminal device, for supplying said direct-current power to said line terminal device, said DC-DC converter having a switching transistor with a control input; and input direct-current control means including a central processing unit, connected to said control input of the switching transistor and the transistor circuit, for controlling said switching transistor of said DC-DC converter so as to obtain highest efficiency of receiving power of the DC-DC converter within a predetermined range and to cause the direct-current resistance of the telephone line power utility circuit, viewed from the telephone line-side, to be within a predetermined range and for changing said bias current of the separation transistor so as to control power loss in said separation transistor.

14. A telephone line power utility circuit, in which direct-current power supplied through a telephone line is utilized as a power source for a line terminal device, comprising:

DC-DC converter connected to said line terminal device, for supplying said direct-current power to said line terminal device, said DC-DC converter having a transformer with a primary side winding and a switching element with a duty ratio connected to said winding;

duty ratio control means for controlling the duty ratio of said switching element of said DC-DC converter so as to obtain highest efficiency of receiving power of the DC-DC converter within a predetermined range and to cause the direct-current resistance of the telephone line power utility circuit, viewed from the telephone line-side, to be within a predetermined range;

a diode bridge having an input connected to a telephone line, and further having an output, a hook switch having an input connected to the output of said diode bridge, a low pass filter connected to an input of said DC-DC converter, a separation transistor having a current path connected between said hook switch and said low pass filter, and said separation transistor further having a control input connected to said duty ratio control means;

a bias shunt resistance circuit connected between said control input of said separation transistor and said duty ratio control means; and said duty ratio control means including means for:
      changing the duty ratio of said switching element of said DC-DC convertor so as to maintain said direct-current resistance of the telephone line power utility circuit close to a reference value which is a highest resistance value permitted by the predetermined range, and
      changing a bias shunt resistance value of said bias shunt resistance circuit so as to control power loss in said separation transistor.

15. A telephone line power utility circuit, in which direct-current power supplied through a telephone line is utilized as a power source for a line terminal device, comprising:

a transistor circuit which includes a separation transistor having a control input and a current path and a bias circuit which supplies a bias current to said control input of the separation transistor;
      a DC-DC converter connected to said line terminal device, for supplying said direct-current power to said line terminal device, said DC-DC converter having a primary side switching element with a duty ratio, said switching element including a switching transistor with a control input; and
   duty ratio control means including a central processing unit, connected to said control input of the switching transistor and the transistor circuit, for controlling the duty ratio of said primary side switching element of said DC-DC converter so as to obtain highest efficiency of receiving power of the DC-DC converter within a predetermined range and to cause the direct-current resistance of the telephone line power utility circuit, viewed from the telephone line-side, to be within a predetermined range and for changing said bias current of the separation transistor so as to control power loss in said separation transistor.

16. A telephone line power utility circuit, in which direct-current power supplied through a telephone line is utilized as a power source for a line terminal device, comprising:

DC-DC converter connected to said line terminal device, for supplying said direct-current power to said line terminal device, said DC-DC converter having a transformer with a primary side winding, said primary side winding having turns, and taps for increasing or decreasing the number of turns of said primary side winding;

tap changer means for switching the taps of the primary side winding of said transformer of the DC-DC converter so as to obtain highest efficiency of receiving power of the DC-DC converter within a predetermined range and to cause the direct-current resistance of the telephone line power utility circuit, viewed from the telephone line-side, to be within a predetermined range;

a diode bridge having an input connected to a telephone line, and further having an output, a hook switch having an input connected to the output of said diode bridge, and further having an output;

a low pass filter connected to an input of said DC-DC converter, and a separation transistor having a current path connected between said hook switch and said low pass filter and a control input connected to said tap changer means.

17. A power supply for use in a line terminal device, the power supply including a DC-DC converter means having a transformer with a primary winding and a switching element with a duty ratio connected to the primary said winding, comprising:

a transistor circuit associated with the DC-DC converter which includes a separation transistor having a control input and a current path and a bias circuit for supplying a bias current to said control input of the separation transistor;

bias means for controlling a bias current of said separation transistor so as to control power loss in said separation transistor; and duty ratio control means, connected to said switching element, for controlling the duty ratio of the switching element of said DC-DC converter so as to obtain highest efficiency of receiving power of the DC-DC converter within a predetermined range.

18. A power supply according to claim 17, wherein said bias means include means for obtaining a voltage across said current path of the separation transistor to compare the first said voltage with a predetermined reference voltage and changing the first said voltage transistor so as to maintain the first said voltage to said predetermined reference voltage.

19. A power supply according to claim 17, wherein said bias circuit includes a bias shunt resistance connected between said control input of said separation transistor and said bias means, said bias means including means for changing a bias shunt resistance value of said bias shunt resistance.

20. A power supply according to claim 17,
   further including a central processing unit, said bias means includes means for:
  obtaining a voltage across said current path of the separation transistor;
  comparing the first said voltage with a predetermined reference voltage; and
  changing the first said voltage so as to maintain the first said voltage to said predetermined reference voltage;
said duty ratio control means includes means for:
  sensing an input current of an input of said DC-DC converter and an input voltage of said transistor circuit;
  calculating a resistance using the input voltage and the input current;
  comparing the resistance with a reference value which is a highest resistance value permitted by said predetermined range; and
  changing said duty ratio of said switching element so as to maintain said resistance close to said highest resistance value.

* * * * *